United States Patent [19]

Förster

[11] Patent Number: 5,083,981
[45] Date of Patent: Jan. 28, 1992

[54] TWO-MASS FLY-WHEEL FOR A MOTOR VEHICLE

[75] Inventor: Andreas Förster, Schweinfurt, Fed. Rep. of Germany

[73] Assignee: Fichtel & Sachs AG, Schweinfurt, Fed. Rep. of Germany

[21] Appl. No.: 446,620

[22] Filed: Dec. 6, 1989

[30] Foreign Application Priority Data

Dec. 8, 1988 [DE] Fed. Rep. of Germany ....... 3841363

[51] Int. Cl.$^5$ ............................ F16D 3/66; F16D 3/80
[52] U.S. Cl. ........................................ 464/68; 74/574; 277/167.5; 464/24
[58] Field of Search ........................ 464/24, 64, 66–68; 192/106.2; 74/574; 277/167.3, 167.5, 189

[56] References Cited

U.S. PATENT DOCUMENTS

| 4,788,884 | 12/1988 | Reik et al. ..................... 192/106.2 X |
| 4,813,524 | 3/1989 | Reik .................................. 464/66 X |

FOREIGN PATENT DOCUMENTS 2160296 12/1985 United Kingdom ................. 464/64

Primary Examiner—Daniel P. Stodola
Assistant Examiner—William G. Battista, Jr.
Attorney, Agent, or Firm—Toren, McGeady & Associates

[57] ABSTRACT

The two-mass fly-wheel for a motor vehicle includes a first fly-wheel (3) rotatable about a rotation axis (1) and containing, axially on one side, a chamber (13) limited by a substantially cylindrical inner circumferential wall (11). A second fly-wheel (7) is coaxially mounted on the first fly-wheel (3). A lid (15) secured on the first fly-wheel (3) seals off the chamber (13) fluid-tightly from the second fly-wheel (7). In the chamber (13) a torsional vibration damper (9) is arranged of which the side disc (23) axially adjacent to the lid (15) is axially clamped in, outside the circumferential wall (11) of the chamber (13), between the lid (15) and an end wall (37) of the first fly-wheel (3). One of the two side discs (21, 23) of the torsional vibration damper (9) is provided, radially within the circumerential wall (11) of the chamber (13), with a plurality of axially protruding noses (55) staggered in the circumferential direction in relation to one another, which engage with play in the circumferential direction through openings (57) of a hub disc (19) of the torsional vibration damper and without play in the circumferential direction in openings (59) of the other side disc. In the case of such a construction the torsional vibration damper can in a simple manner be connected with the first fly-wheel (3) and sealed in relation to the first fly-wheel (3).

4 Claims, 3 Drawing Sheets

TWO-MASS FLY-WHEEL FOR A MOTOR VEHICLE

BACKGROUND OF THE INVENTION

The invention relates to a two-mass fly-wheel for a motor vehicle.

From German Utility Model No. 8,525,614 a two-mass fly-wheel for a motor vehicle is known, of which the first fly-wheel, which is to be secured on the crank-shaft of the internal combustion engine of the motor vehicle, contains, on the side axially remote from the internal combustion engine, a chamber defined by a substantially cylindrical inner circumferential wall. On the first fly-wheel, on the side of the chamber, a second fly-wheel is coaxially rotatably mounted, which at the same time forms a basis for a friction clutch of the motor vehicle. The two fly-wheels are rotationally elastically coupled with one another through a torsional vibration damper arranged in the chamber, and a lid secured on the first fly-wheel seals off the chamber to the second fly-wheel in fluid-tight manner. Thus, the chamber can be at least partially filled with lubricant in order to reduce friction of the components of the torsional vibration damper. In the known two-mass fly-wheel the torsional vibration damper comprises a hub disc guided rotatably in the chamber and two side discs arranged axially on both sides of the hub disc, which are connected firmly with one another and with the first fly-wheel in a comparatively expensive construction, by distance rivets. The lid is secured to the first fly-wheel by separate rivets.

The invention now shows a way to simplify a two-mass fly-wheel of the above kind, especially as regards the connection of the torsional vibration damper with the first fly-wheel on the crank-shaft side.

SUMMARY OF THE INVENTION

The invention is based upon a two-mass fly-wheel for a motor vehicle having two fly-wheels which are rotatable about a rotation axis both in common and in relation to one another. The first fly-wheel contains, on the side which is axially remote when the crank-shaft is in the installed condition, a chamber limited by a substantially cylindrical inner circumferential wall and is connected with a bearing which holds the second fly-wheel, arranged axially opposite to the chamber. The chamber is sealed off in a fluid-tight manner from the second fly-wheel by a lid held on the first fly-wheel and can be at least partially filled with a lubricant. In the chamber, a torsional vibration damper is arranged which rotationally elastically couples the two fly-wheels with one another. The torsional vibration damper has a hub disc guided rotatably in relation to the first fly-wheel and two side discs arranged axially on both sides of the hub disc. In windows, directed axially in relation to one another, of the hub disc, for the one part, and of the two side discs, for the other part, there are arranged helical springs which rotationally elastically connect the side discs with the hub disc. The side disc axially adjacent to the lid is clamped in axially, radially outside the circumferential wall of the chamber, between the lid and an end wall of the first fly-wheel and thus can be secured on the first fly-wheel, utilizing the securing elements of the lid. In this way separate rivets or the like are eliminated. The second side disc, like the hub disc too, is guided radially by the cylindrical circumferential wall of the chamber. For the rotation-fast connection with the side disc axially adjacent to the lid, one of the two side discs is provided with several axially protruding noses staggered in relation to one another in the circumferential direction, which engage with play in the circumferential direction through openings of the hub disc and without play in the circumferential direction in openings of the other side disc in each case. Separate rivet connections between the two side discs, such as are usual in conventional torsional vibration dampers, can thus likewise be eliminated.

In an expedient development it is provided that the lid and the side disc adjacent to it are secured with common rivets, arranged on a circle around the axis of rotation, on the end wall of the first fly-wheel. Thus, a comparatively stable fastening of both the lid and the side disc is achieved with a few rivets.

The sealing of the radially outer circumferential zone of the chamber can take place, in the development as explained above, with two sealing rings, for example O-rings or round cord rings. For this purpose, a first ring groove can be arranged in the end wall radially between the circle of arrangement of the rivets and the circumferential wall of the chamber, and a first sealing ring resting on the side disc can be arranged in the first ring groove. On mutually axially facing sides of the side disc and of the lid there can be impressed further ring grooves of equal diameter with the first ring groove, which enclose a second sealing ring between them. Due to the operation of impressing the ring grooves, annular webs occur on the side of the side disc and of the lid remote in each case from the ring groove. The annular web of the side disc here engages in the first ring groove provided in the side wall of the first fly-wheel. Due to this configuration it is possible with very low expense to provide a completely fluid-tight arrangement. Since the side discs and the lid are sheet metal parts, the impressed ring grooves can be produced at very favorable cost.

In another development it is provided that the lid is independently secured on the end wall of the first fly-wheel with rivets arranged on a circle around the axis of rotation. The side disc axially adjacent to the lid has an external diameter which is smaller than the circle of the arrangement of the rivets and is connected fast in rotation directly with the lid, so that torques exerted upon the first fly-wheel are conducted by way of the lid on to the side disc. This is expediently effected in that the end wall comprises a recess annularly enclosing the axis of rotation and adjoining the chamber, in which recess the side disc engages with its external circumference. In the region of its external circumference, toothings protruding axially towards the lid are formed on the side disc and engage in matching counter-toothings formed on the lid and guide the side disc fast in rotation on the lid. The toothings are impressed at favorable cost into the side disc and lid respectively which are again formed as sheet metal parts, preferably in such a way that the toothings at the same time radially center the side disc on the lid. A single sealing ring (O-ring) suffices for the sealing, if the diameter of the recess is greater than the external diameter of the side disc and the sealing ring is laid into the recess so that it rests both on the external circumference of the side disc and also on the lid. The axial depth of the recess corresponds substantially to the material thickness of the side disc.

The noses formed on the one side disc expediently form, together with the openings of the hub disc, end stops for rotary travel limitation of the hub disc. For simplification of the torque transmission from the first fly-wheel to the two side discs, the noses are expediently formed on the side disc axially adjacent to the lid, that is on the side disc placed axially towards the chamber exterior.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
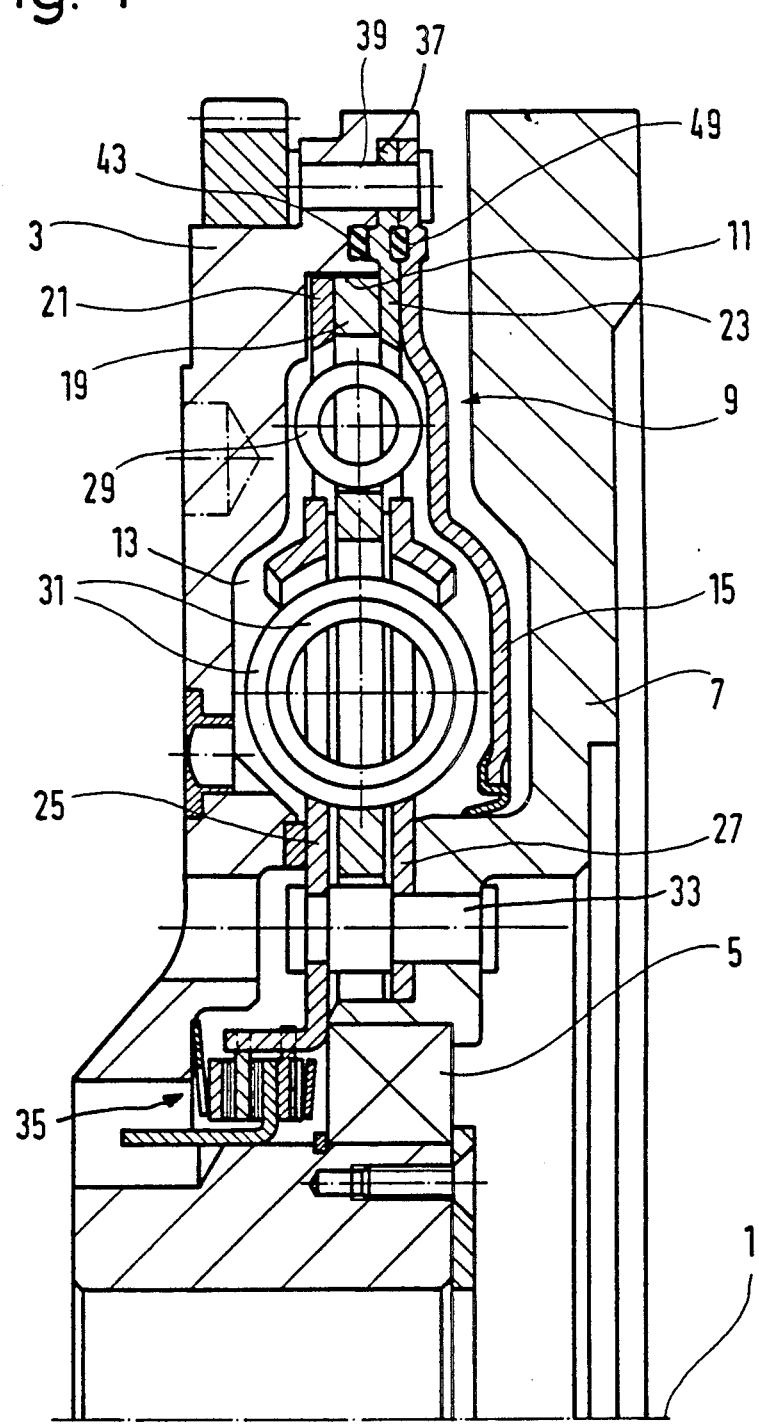
FIGS. 1 and 2 show axial longitudinal sections through an upper and a lower half of a two-mass fly-wheel.
Figure 2:
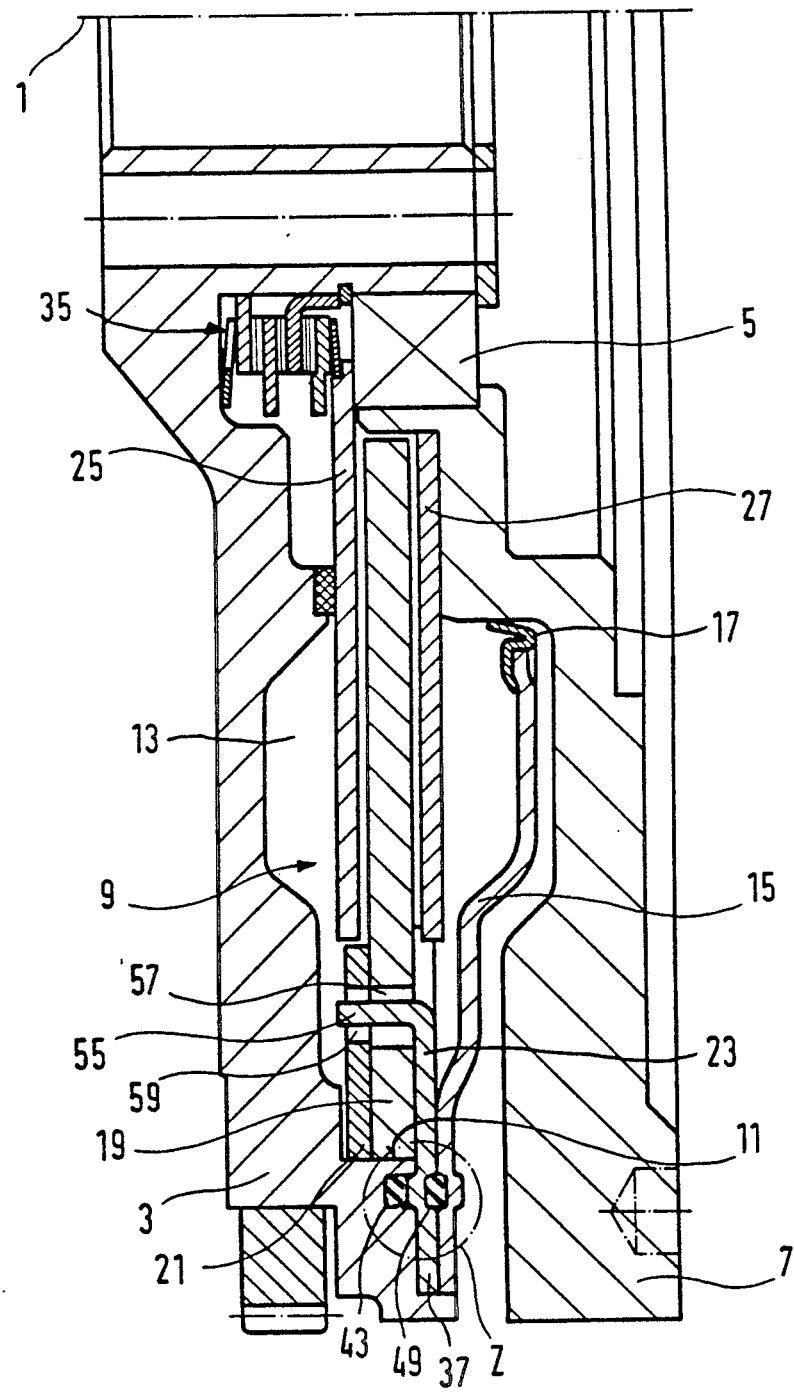

The two-mass fly-wheel for the drive line of a motor vehicle, as represented in FIGS. 1 and 2, includes a first fly-wheel 3 rotating about a rotation axis 1 and to be secured on a crank-shaft (not further illustrated) of the internal combustion engine of the motor vehicle, and a second fly-wheel 7 mounted coaxially rotatably on the fly-wheel 3 by means of a bearing 5. The fly-wheel 7 is arranged on the side of the fly-wheel 3 axially facing the gear of the motor vehicle and in the usual way forms a basis for a friction clutch (not illustrated further). Axially between the two fly-wheels 3, 7 there is arranged a torsional vibration damper designated generally by 9, which couples the two fly-wheels 3, 7 rotationally elastically with one another for rotation in relation to one another through a limited angle of rotation.

The torsional vibration damper 9 is accommodated in a chamber 13, limited radially outwards by a cylindrical inner peripheral wall 11, on the side of the fly-wheel 3 axially facing the fly-wheel 7. The chamber 13 is closed off towards the fly-wheel 7 by a lid 15 having an annular disc form secured to the fly-wheel 3. An annular lip seal 17 seals off the internal circumference of the lid 15 in relation to the fly-wheel 7. The lid 15, which is sealed off in the region of its external circumference to the first fly-wheel too, in a manner explained in greater detail hereinafter, together with the first fly-wheel 3, limits a radially outwardly fluid-tight space for the reception of lubricant to reduce wear of the torsional vibration damper 9.

The torsional vibration damper 9 has an annular hub disc 19 guided radially in the chamber 13 and axially on both sides of the two pairs of the side discs 21, 23 and 25, 27 of the hub disc 19. The side discs 21, 23, 25 and 27 have substantially annular disc form, with the side discs 21, 23 having a larger diameter than the side discs 25, 27 and annularly enclosing these side discs. The side discs 21, 23, for the one part, and also the side discs 25, 27, for the other part, are each rotationally elastically coupled with the hub disc 19 by several helical compression springs 29 and 31 staggered in relation to one another in the circumferential direction. The helical compression springs 29, 31 are seated, as is customary in such torsional vibration dampers, in mutually axially aligned windows of the side discs, for the one part, and the hub disc, for the other part. As readily visible by reason of the construction, the helical compression springs 29, 31 for the relative rotation of the side disc pairs 21, 23, for the one part, and 25, 27, for the other part, are connected in series. While the side disc pair 25, 27 is firmly connected by distance rivets 33 with the fly-wheel 7, the side disc pair 21, 23 is coupled fast in rotation with the fly-wheel 3 in a manner explained in greater detail hereinafter. The torsional vibration damper 9 can be provided, as represented at 35, with a friction device.

Figure 3:
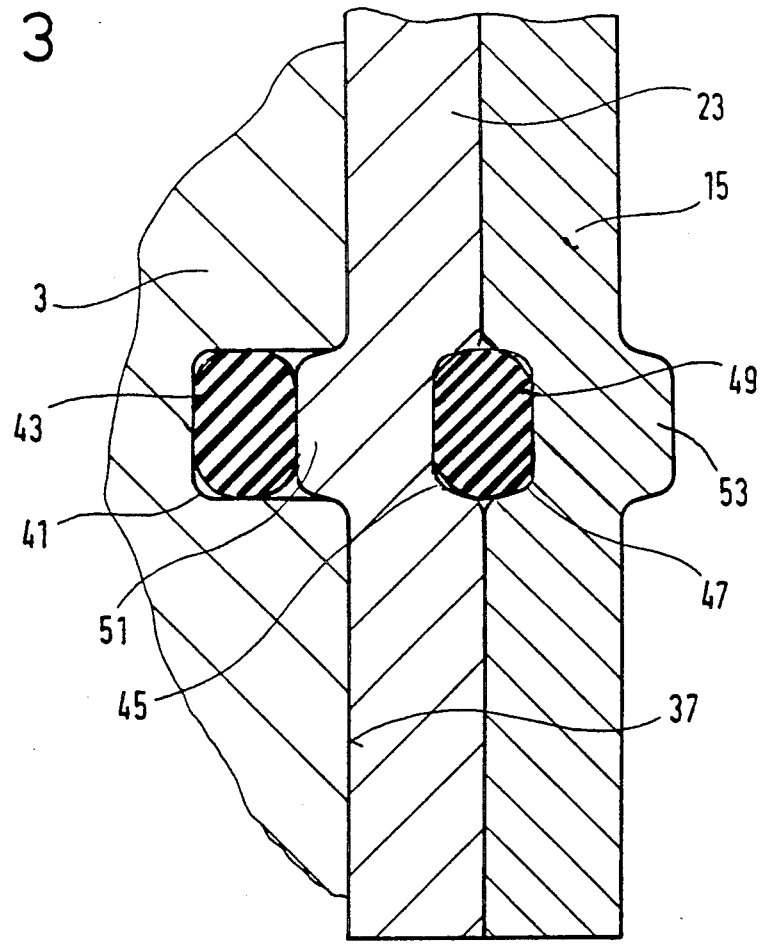
FIG. 3 shows an enlarged sectional view of a detail Z from FIG. 2.

The outer side disc 23, axially adjacent to the lid 15, has the same external diameter as the lid 15 and is clamped in between an end wall 37 of the fly-wheel, radially outwardly adjoining the chamber 13 and perpendicular to the rotation axis 1, and the lid 15. The lid 15 and the side disc 23 are held in the region of the end wall 37 on the fly-wheel 3 by common rivets 39 arranged on a circle around the rotation axis 1. Radially between the circle of arrangement of the rivets 39 and the circumferential wall 11 of the chamnber 13, there is provided in the end wall 37 an annular groove 41 open towards the side disc 23 and concentrically enclosing the rotation axis 1, in which groove 41 a sealing ring 43 is seated, as shown best by FIG. 3. At least the side disc 23 and the lid 15 are sheet metal shaped parts and contain further annular grooves 45, 47, concentric with the rotation axis and with equal diameter to the annular groove 41, in axially mutually adjacent faces, which grooves enclose a second sealing ring 49 between them. The annular grooves 45, 47 are impressed into the sheet metal shaped parts, whereby matching annular webs 51, 53 are produced on the turned-away faces of the sheet metal shaped parts. The annular web 51 of the side disc 23 extends axially into the annular groove 41 of the fly-wheel 3, and lies in a sealing manner against the annular seal 43. It is the advantage of the construction as explained above that it is simple to produce and can be fitted with low expense.

From the side disc 23 firmly connected with the fly-wheel 3, there protrude, on the circle of arrangement of the helical compression springs 29 but in each case offset in the circumferential direction in relation to the helical compression springs 29, noses 55 (FIG. 2) which engage with play in the circumferential direction through openings 57 of the hub disc 19 and without play in the circumferential direction in openings 59 of the side disc 21. The noses 55 connect the two side discs 21, 23 fast in rotation with one another and at the same time, by reason of their play in the circumferential direction, form a limitation of rotational movement of the hub disc 19 in relation to the side disc pair 21, 23. The helical compression springs 29 can thus be dimensioned for a first damper stage of a multi-stage torsional vibration damper, which is bridged over after the circumferential play of the noses 55 in the openings 57 is taken up, so that only a second damping stage, here determined by the helical compression springs 31, comes into effect.

Figure 4:
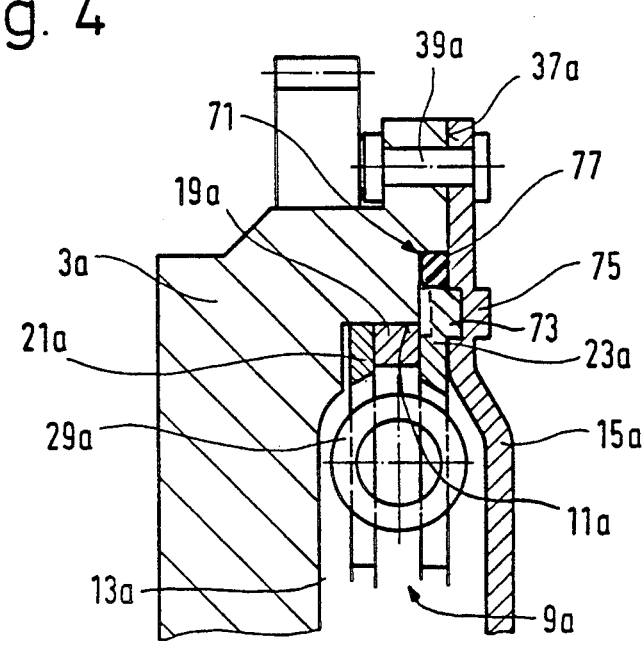
FIG. 4 shows a partial sectional view of a variant of a two-mass fly-wheel.

FIG. 4 shows a variant of a two-mass fly-wheel for a motor vehicle, which differs from the two-mass fly-wheel according to FIG. 1 essentially only in the fixing and sealing of the outer side disc of the torsional vibration damper. Components of like effect are therefore provided with the reference numerals of FIGS. 1 and 2 and with the letter "a" for distinction. For explanation reference is made to the description of FIGS. 1 and 2.

In departure from the two-mass fly-wheel according to FIGS. 1 and 2, the lid 15a which seals off the chamber 13a of the first fly-wheel 3a, to be connected with the crankshaft, from the second fly-wheel, is separately secured on an end wall 37a of the fly-wheel 3a, normal to the rotation axis, radially outside the cylindrical circumferential wall 11a of the chamber 13a, with the aid of several rivets 39a arranged on a circle around the rotation axis. The external diameter of the side disc 23a axially adjacent to the lid 15a is smaller than the circle of arrangement of the rivets 39a. The side disc 23a engages with the region of its external circumference in an annular recess 71 of the end wall 37a radially outwardly adjoining the circumferential wall 11a, where it is clamped in between the lid 15a and the fly-wheel 3a. The axial depth of the recess 71 is for this purpose made equal to the material thickness of the side disc 23a. At least the side disc 23a and the lid 15a are again formed as sheet metal shaped parts. In the region of the external circumference of the side disc 23a there are formed towards the lid 15a, toothings 73 distributed in the circumferential direction which engage in matching counter-toothings 75 formed on the lid 15. The axial height or depth of the toothing 73, 75 is made so large that the side disc 23a is centered radially on the lid 15a and by means of that on the fly-wheel 3a. The recess 71 extends radially beyond the external circumference of the side disc 23a, and, in the annular space thus formed, a single sealing ring 77a is arranged which seals off the fly-wheel 3a both from the side disc 23a and from the lid 15a. In this development of the invention too, a constuctionally simple connection and seal of the torsional vibration damper with the first fly-wheel is achieved.

While specific embodiments of the invention have been shown and described in detail to illustrate the application of the inventive principles, it will be understood that the invention may be embodied otherwise without departing from such principles.

What I claimed is:

1. A two-mass fly-wheel for a motor vehicle, comprising:
   a first fly-wheel (3) rotatable about a rotation axis (1), said first fly-wheel having axially on one side a chamber (13) limited by a substantially cylindrical inner circumferential wall (11);
   a second fly-wheel (7) connected with the first fly-wheel (3) rotatably coaxially relative to the first fly-wheel (3), on the side of the first fly-wheel (3) having the chamber (13);
   a lid (15) secured to the first fly-wheel (3) so as to seal off the chamber (13) in a fluid tight manner towards the second fly-wheel (7);
   a torsional vibration damper arranged in the chamber (13) so as to couple the first and second fly-wheels (3, 7) rotationally elastically with one another, said damper including a hub disc (19) having windows, and two side discs (21, 23) having windows and being arranged on axially opposite sides of the hub disc (19) and connected non-rotatably with the first fly-wheel (3) so that one (23) of the side discs (21, 23) is axially adjacent to the lid (15); and
   helical springs (29) arranged so as to be partially in the windows of the hub disc (19) and partially in the windows of the side discs (21, 23), the side disc (23) axially adjacent to the lid (15) being clamped radially outside the circumferential wall (11) of the chamber (13) axially in between the lid (15) and an end wall (37) of the first fly-wheel (3), the end wall (37) bordering radially outwardly at the circumferential wall (11), one of the two side discs (23) comprising, radially within the circumferential wall (11) of the chamber (13), a plurality of axially protruding noses (55) offset relative to one another in a circumferential direction, which noses engage with play in the circumferential direction through openings (57) of the hub disc (19) and without play in the circumferential direction in openings (59) of the other of the side discs (21), the lid (15) and the one side disc (23) axially adjacent to the lid (15) being secured with common rivets (39) arranged in a circle around the rotation axis (1) on the end wall of the first fly-wheel (3), in the end wall (37) radially between the circle of arrangement of the rivets (39) and the circumferential wall (11) of the chamber (13), a first annular groove (41) is arranged, and in the first annular groove (41) there is arranged a first sealing ring (43) resting on the side disc (23), on mutually axially facing sides of the side disc (23) and of the lid (15) there are impressed further annular grooves (45, 47) of equal diameter with the first annular groove (41), which further grooves enclose a second sealing (49) between them, a swagged annular web (51), which engages in the first annular groove (41), being allocated at least to the annular groove (45) and pressed into the side disc (23) on the side of the end wall (37).

2. A two-mass fly-wheel for a motor vehicle, comprising:
   a first fly-wheel (3) rotatable about a rotation axis (1), said first fly-wheel having axially on one side a chamber (13) limited by a substantially cylindrical inner circumferential wall (11);
   a second fly-wheel (7) connected with the first fly-wheel (3) rotatably coaxially relative to the first fly-wheel (3), on the side of the first fly-wheel (3), having the chamber (13);
   a lid (15) secured to the first fly-wheel (3) so as to seal off the chamber (13) in a fluid-tight manner towards the second fly-wheel (7);
   a torsional vibration damper arranged in the chamber (13) so as to couple the first and the second fly-wheels (3, 7) rotationally elastically with one another, said damper including a hub disc (19) having windows, and two side discs (21, 23) having windows and being arranged on axially opposite sides of the hub disc (19) and connected non-rotatably with the first fly-wheel (3) so that one (23) of the side discs (21, 23) is axially adjacent to the lid (15); and
   helical springs (29) arranged so as to be partially in the windows of the hub disc (19) and partially in the windows of the side discs (21, 23), the side disc (23) axially adjacent to the lid (15) being clamped radially outside the circumferential wall (11) of the chamber (13) axially in between the lid (15) and an end wall (37) of the first fly-wheel (3), the end wall (37) bordering radially outwardly at the circumferential wall (11), one of the two side discs (23) comprising, radially within the circumferential wall (11) of the chamber (13), a plurality of axially protruding noses (55) offset relative to one another in a circumferential direction, which noses engage with play in the circumferential direction through openings (57) of the hub disc (19) and without play in the circumferential direction in openings (59) of the other of the side discs (21), the lid (15a) being separately secured on the end wall (37a) of the first fly-wheel (3a) with rivets (39a) arranged in a circle around the rotation axis, and the side disc (23a) axially adjacent to the lid (15a) having an external diameter smaller than the circle in which the rivets (39a) are arranged, being connected directly and rotationally fixed with the lid (15a), the end wall (31a) having a recess (71) adjoining the chamber (13a) and annularly surrounding the rotation axis, in which recessed the side disc (23a) axially adjacent the lid (15a) engages with its external circumference, the diameter of the recess (71) being greater than the external diameter of the side disc (23a) axially adjacent to the lid (15a), in the recess (71) there is arranged a sealing ring (77) which rests both on the external circumference of the side disc (23a) and the lid (15a).

3. A two-mass fly-wheel according to claim 2, wherein in the region of the external circumference of the side disc (23a) there are impressed toothings (73) protruding axially towards the lid (15a), which engage in matching counter-toothings (75) formed on the lid (15a), and guide the side disc (23a) fast in rotation on the lid (15a).

4. A two-mass fly-wheel according to claim 3, wherein the side disc (23a) axially adjacent to the lid (15a) is radially centered on the lid (15a) by means of the toothings (73).

* * * * *